United States Patent
Mugunda et al.

(10) Patent No.: US 10,725,511 B2
(45) Date of Patent: *Jul. 28, 2020

(54) SYSTEMS AND METHODS FOR THERMAL CONTROL OF INFORMATION HANDLING RESOURCES BASED ON SYSTEM ARCHITECTURE

(71) Applicant: Dell Products L.P., Round Rock, TX (US)

(72) Inventors: Chandrasekhar Mugunda, Austin, TX (US); Yogesh P. Kulkarni, Round Rock, TX (US); Sruthi Reddy Mothukupally, Cedar Park, TX (US); Srinivasa Rao Nagalla, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 149 days.

This patent is subject to a terminal disclaimer.

(21) Appl. No.: 15/945,563

(22) Filed: Apr. 4, 2018

(65) Prior Publication Data

US 2019/0310693 A1 Oct. 10, 2019

(51) Int. Cl.
*G05D 16/00* (2006.01)
*G06F 1/20* (2006.01)
*G05B 15/02* (2006.01)
*G06F 9/4401* (2018.01)

(52) U.S. Cl.
CPC ............ *G06F 1/206* (2013.01); *G05B 15/02* (2013.01); *G06F 9/4401* (2013.01)

(58) Field of Classification Search
CPC ....................................................... G05B 15/02
USPC ......................................................... 700/300
See application file for complete search history.

(56) References Cited

U.S. PATENT DOCUMENTS

| | | | | |
|---|---|---|---|---|
| 7,426,109 B2 * | 9/2008 | Lindell | ............... | H05K 7/20836 361/679.48 |
| 7,742,844 B2 * | 6/2010 | Coxe, III | ........... | H05K 7/20836 165/200 |
| 9,176,564 B2 * | 11/2015 | Coxe, Jr. | ................ | G06F 1/3225 |
| 9,223,326 B2 * | 12/2015 | Allen-Ware | ........ | G06F 11/2023 |
| 10,082,848 B2 * | 9/2018 | Iyer | ......................... | G06F 1/206 |
| 2015/0198957 A1 * | 7/2015 | Montero | ................. | G06F 1/206 700/300 |
| 2016/0291654 A1 * | 10/2016 | Iyer | ......................... | G06F 1/206 |

\* cited by examiner

*Primary Examiner* — Md Azad
(74) *Attorney, Agent, or Firm* — Jackson Walker L.L.P.

(57) ABSTRACT

A method may include identifying a respective location of a particular information handling resource within an information handling system, based on the respective location, reading an entry from a thermal table comprising thermal parameters for thermal management of one or more information handling resources of the information handling system based on respective locations of the one or more information handling resources within the information handling system, and applying at least one thermal parameter from the entry for thermal management of the particular information handling resource.

9 Claims, 2 Drawing Sheets

SYSTEMS AND METHODS FOR THERMAL CONTROL OF INFORMATION HANDLING RESOURCES BASED ON SYSTEM ARCHITECTURE

TECHNICAL FIELD

The present disclosure relates in general to information handling systems, and more particularly to systems and methods for providing thermal control support for processor information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

One disadvantage of existing approaches to thermal control of information handling systems is that oftentimes, thermal control algorithms do not take into account a physical location of an information handling resource when setting parameters for thermal control. Thus, many existing approaches apply "worst case" parameters, which may result in inefficiency in current approaches to thermal control.

SUMMARY

In accordance with the teachings of the present disclosure, the disadvantages and problems associated with thermal control in information handling systems may be substantially reduced or eliminated.

In accordance with embodiments of the present disclosure, an information handling system may include a processor and a management controller communicatively coupled to the processor, and having stored thereon a thermal table comprising thermal parameters for thermal management of one or more information handling resources of the information handling system based on respective locations of the one or more information handling resources within the information handling system and firmware comprising instructions executable on the management controller. The firmware may be configured to, for each particular information handling resource of the one or more information handling resources identify a respective location of the particular information handling resource within the information handling system, based on the respective location, read an entry from the thermal table, and apply at least one thermal parameter from the entry for thermal management of the particular information handling resource.

In accordance with these and other embodiments of the present disclosure, a method may include identifying a respective location of a particular information handling resource within an information handling system, based on the respective location, reading an entry from a thermal table comprising thermal parameters for thermal management of one or more information handling resources of the information handling system based on respective locations of the one or more information handling resources within the information handling system, and applying at least one thermal parameter from the entry for thermal management of the particular information handling resource.

In accordance with these and other embodiments of the present disclosure, an article of manufacture may include a non-transitory computer readable medium and computer-executable instructions carried on the computer readable medium, the instructions readable by a processor. The instructions, when read and executed, may cause the processor to identify a respective location of a particular information handling resource within an information handling system, based on the respective location, read an entry from a thermal table comprising thermal parameters for thermal management of one or more information handling resources of the information handling system based on respective locations of the one or more information handling resources within the information handling system, and apply at least one thermal parameter from the entry for thermal management of the particular information handling resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
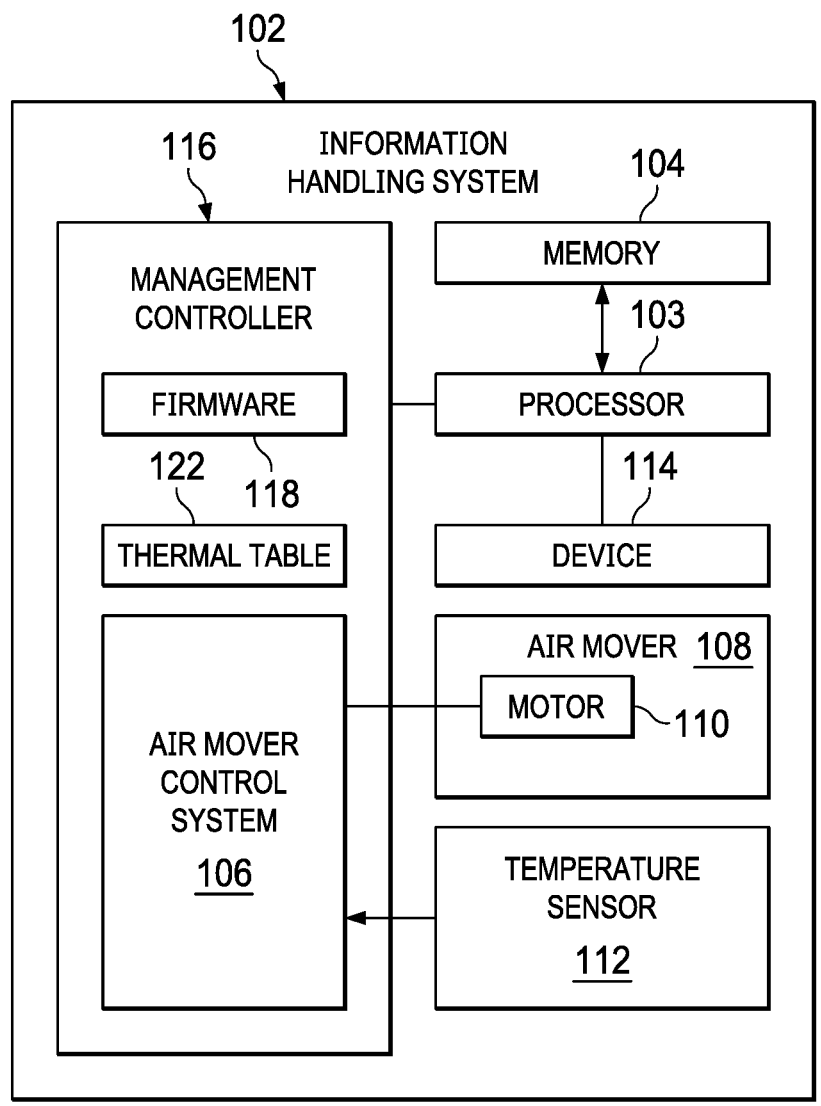
FIG. 1 illustrates a block diagram of an example information handling system, in accordance with the present disclosure.
Figures 2, 3:
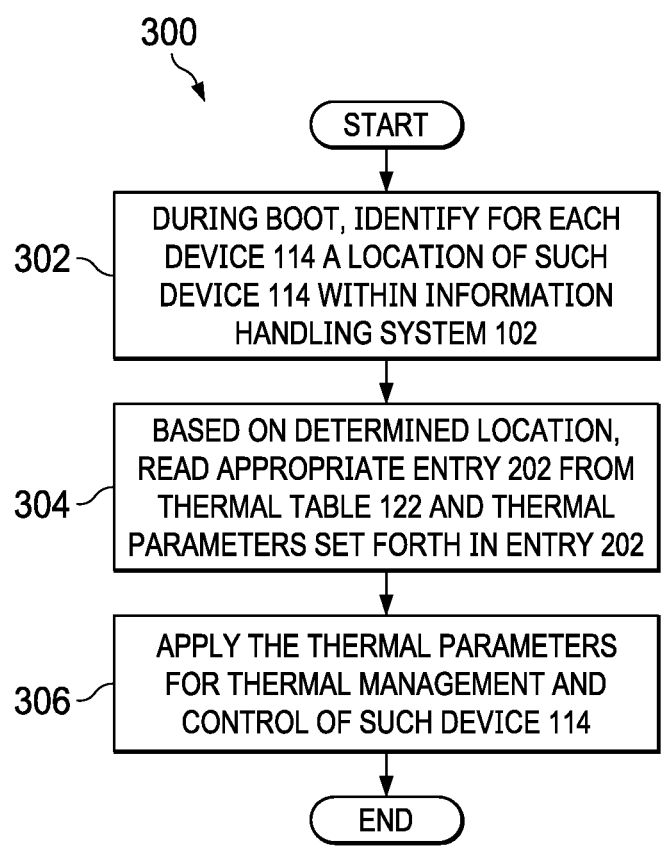
FIG. 2 illustrates an example thermal table which may be used in connection with providing thermal control support in an information handling system, in accordance with embodiments of the present disclosure.
FIG. 3 illustrates a flow chart of an example method for providing thermal control of information handling resources based on a system architecture, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, an information handling system 102 may comprise a processor 103, a memory 104 communicatively coupled to processor 103, an air mover 108 communicatively coupled to an air mover control system 106, a temperature sensor 112 communicatively coupled to air mover control system 106, one or more devices 114 communicatively coupled to processor 103, and a management controller 116 communicatively coupled to processor 103.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Air mover 108 may be communicatively coupled to air mover control system 106, and may include any mechanical or electro-mechanical system, apparatus, or device operable to move air and/or other gases. In some embodiments, air mover 108 may comprise a fan (e.g., a rotating arrangement of vanes or blades which act on the air). In other embodiments, air mover 108 may comprise a blower (e.g., a centrifugal fan that employs rotating impellers to accelerate air received at its intake and change the direction of the airflow). In these and other embodiments, rotating and other moving components of air mover 108 may be driven by a motor 110. The rotational speed of motor 110 may be controlled by the air mover control signal communicated from air mover control system 106. In operation, air mover 108 may cool information handling resources of information handling system 102 by drawing cool air into an enclosure housing the information handling resources from outside the chassis, expel warm air from inside the enclosure to the outside of such enclosure, and/or move air across one or more heatsinks (not explicitly shown) internal to the enclosure to cool one or more information handling resources.

A temperature sensor 112 may be any system, device, or apparatus (e.g., a thermometer, thermistor, etc.) configured to communicate a signal to air mover control system 106 indicative of a temperature within information handling system 102.

For ease of exposition, FIG. 1 depicts only one each of air mover control system 106, air mover 108, and temperature sensor 112. However, it is noted that information handling system 102 may include two or more air movers 108 and each such air mover 108 may have a dedicated respective air mover control system 106. It is further noted that an air mover control system 106 may receive temperature signals from one or more temperature sensors 112, and that a single temperature sensor 112 may communicate temperature signals to one or more air mover control systems 106.

Device 114 may be communicatively coupled to processor 103 and may generally include any information handling resource. In some embodiments, device 114 may comprise an Open Compute Project (OCP) port.

Management controller 116 may be configured to provide out-of-band management facilities for management of information handling system 102. Such management may be made by management controller 116 even if information handling system 102 is powered off or powered to a standby state. Management controller 116 may include a processor, memory, out-of-band network interface separate from and physically isolated from an in-band network interface of information handling system 102, and/or other embedded information handling resources. In certain embodiments, management controller 116 may include or may be an integral part of a baseboard management controller (BMC) or a remote access controller (e.g., a Dell Remote Access Controller or Integrated Dell Remote Access Controller). In other embodiments, management controller 116 may include or may be an integral part of a chassis management controller (CMC).

As shown in FIG. 1, management controller 116 may include firmware 118, thermal table 122, and air mover control system 106. Firmware 118 may include a program of executable instructions configured to be read and executed by management controller 118 in order to carry out the functionality of management controller 118, including that functionality described herein. In some embodiments, firmware 118 may be configured to undertake a predecessor thermal control support update process, either as a source for such update process or a target for such update process, as described in greater detail below.

Air mover control system 106 may include any system, device, or apparatus configured to receive one or more signals indicative of one or more temperatures within information handling system 102 (e.g., one or more signals from one or more temperature sensors 112), receive information regarding thermal parameters of information handling resources (e.g., information from power and/or thermal tables of management controller 116) and based on such signals and thermal parameters, calculate an air mover driving signal to maintain an appropriate level of cooling, increase cooling, or decrease cooling, as appropriate, and communicate such air mover driving signal to air mover 108. Although FIG. 1 depicts air mover control system 106 integral to management controller 116, in some embodiments, air mover control system 106 may be external to and independent from management controller 116.

Thermal table 122 may comprise a map, list, array, table, or other suitable data structure with one or more entries, each entry setting forth thermal parameters (e.g., target temperatures, maximum temperatures, air mover speed curves, power capping curves for power throttling, etc.) regarding an information handling resource of information handling system 102. In particular, thermal table 122 may set forth thermal parameters based on a location of a device 114 within information handling system 102. For example, in some embodiments, an entry in thermal table 122 may set forth a threshold temperature for a device 114 (e.g., an OCP port) based on a physical location of such device within information handling system 102.

For example, FIG. 2 illustrates an example thermal table 122. As shown in FIG. 2, thermal table 122 may include a plurality of entries 202 (e.g., entries 202A, 202B) setting forth thermal parameters for different devices 114 and locations of devices 114 within information handling system 102.

Thus, with reference to entry 202A, if an OCP port was present in a front portion of information handling system 102, management controller 116 may apply thermal parameters (e.g., a temperature threshold) set forth in entry 202A. On the other hand, if an OCP port was present in a rear portion of information handling system 102, management controller 116 may apply thermal parameters (e.g., a temperature threshold) set forth in entry 202B.

In addition to processor 103, memory 104, air mover control system 106, air mover 108, temperature sensor 112, device 114, and management controller 116, information handling system 102 may include one or more other information handling resources.

FIG. 3 illustrates a flow chart of an example method 300 for providing thermal control of information handling resources based on a system architecture, in accordance with embodiments of the present disclosure. According to certain embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen. In these and other embodiments, method 300 may be implemented as firmware, software, applications, functions, libraries, or other instructions.

At step 302, during a boot-up process of management controller 116, management controller 116 may identify for each device 114, a location of such device 114 within information handling system 102. For example, if device 114 is an OCP port, management controller 116 may identify such location based on general purpose input/output settings.

At step 304, management controller 116 may, based on a device type, the determined location, and/or other characteristics of such device 114, read an appropriate entry 202 from thermal table 122 and the thermal parameters set forth in such entry 202.

At step 306, management controller 116 may apply the thermal parameters for thermal management and control of such device 114, including for operation of air mover control system 106 and/or power management (e.g. throttling). For example, management controller 116 may apply a temperature threshold to thermal management and control of such device 114 such that if such temperature threshold is exceeded (as indicated by a temperature sensed by temperature sensor 112), air mover control system 106 may cause air mover 110 to reduce such temperature and/or management controller 116 may cause throttling of such device.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using a management controller 116, components thereof or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor; and
   a management controller communicatively coupled to the processor, and having stored thereon:
      a thermal table comprising thermal parameters for thermal management of one or more information handling resources of the information handling system based on respective physical locations of the one or more information handling resources within the information handling system, wherein the respective physical locations are indicative of whether the information handling resources are located at a front or a rear of the information handling system; and
      firmware comprising instructions executable by the management controller and configured to, for each particular information handling resource of the one or more information handling resources:
         identify a respective physical location of the particular information handling resource within the information handling system;
         based on the respective physical location, read an entry from the thermal table; and
         apply at least one thermal parameter from the entry for thermal management of the particular information handling resource.

2. The information handling system of claim 1, wherein at least one of the one or more information handling resources comprises an Open Compute Project (OCP) port.

3. The information handling system of claim 1, wherein the at least one thermal parameter comprises a threshold temperature associated with the particular information handling resource.

4. A method comprising:
   identifying a respective physical location of a particular information handling resource within an information handling system, wherein the respective physical location is indicative of whether the information handling resource is located at a front or a rear of the information handling system;
   based on the respective physical location, reading an entry from a thermal table comprising thermal parameters for thermal management of one or more information handling resources of the information handling system based on respective physical locations of the one or more information handling resources within the information handling system; and
   applying at least one thermal parameter from the entry for thermal management of the particular information handling resource.

5. The method of claim 4, wherein the particular information handling resource comprises an Open Compute Project (OCP) port.

6. The method of claim 4, wherein the at least one thermal parameter comprises a threshold temperature associated with the particular information handling resource.

7. An article of manufacture comprising;
   a non-transitory computer readable medium; and
   computer-executable instructions carried on the computer readable medium that are executable by a processor to:
      identify a respective physical location of a particular information handling resource within an information handling system, wherein the respective physical location is indicative of whether the information handling resource is located at a front or a rear of the information handling system;
      based on the respective physical location, read an entry from a thermal table comprising thermal parameters for thermal management of one or more information handling resources of the information handling system based on respective physical locations of the one or more information handling resources within the information handling system; and
      apply at least one thermal parameter from the entry for thermal management of the particular information handling resource.

8. The article of claim 7, wherein the particular information handling resource comprises an Open Compute Project (OCP) port.

9. The article of claim 7, wherein the at least one thermal parameter comprises a threshold temperature associated with the particular information handling resource.

* * * * *